United States Patent
June et al.

(10) Patent No.: US 8,139,354 B2
(45) Date of Patent: Mar. 20, 2012

(54) INDEPENDENTLY OPERABLE IONIC AIR MOVING DEVICES FOR ZONAL CONTROL OF AIR FLOW THROUGH A CHASSIS

(75) Inventors: Michael S. June, Raleigh, NC (US); Chunjian Ni, Durham, NC (US); Mark E. Steinke, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 127 days.

(21) Appl. No.: 12/788,532

(22) Filed: May 27, 2010

(65) Prior Publication Data

US 2011/0292593 A1 Dec. 1, 2011

(51) Int. Cl.
*H05K 7/20* (2006.01)
*A63F 13/06* (2006.01)

(52) U.S. Cl. ......... 361/679.47; 361/679.48; 361/679.49; 361/679.5; 361/694; 361/695; 361/231; 165/80.3; 165/109.1; 165/121; 165/96; 417/49; 315/111.91

(58) Field of Classification Search ............. 361/679.46, 361/679.47, 679.48, 679.5, 690–697, 688, 361/689, 231, 236, 233, 719–724, 825, 831, 361/230; 165/121–126, 109.1, 104.33, 185, 165/802, 803, 96; 174/16.3, 252; 454/184; 417/48–50; 315/111, 111.21, 111.31, 111.91, 315/506; 96/18–26, 63, 80–82; 95/2–8, 95/78–81; 349/60–65, 20, 58, 161
See application file for complete search history.

(56) References Cited

U.S. PATENT DOCUMENTS

| | | | |
|---|---|---|---|
| 3,361,337 A | 1/1968 | Hurst | |
| 4,357,150 A | 11/1982 | Masuda et al. | |
| 6,522,536 B2 | 2/2003 | Brewer et al. | |
| 6,590,267 B1 | 7/2003 | Goodwin-Johansson et al. | |
| 7,031,134 B2 * | 4/2006 | Izumi et al. | 361/231 |
| 7,122,070 B1 | 10/2006 | Krichtafovitch | |
| 7,149,085 B2 | 12/2006 | Chebiam et al. | |
| 7,190,587 B2 | 3/2007 | Kim et al. | |
| 7,197,911 B1 | 4/2007 | Lilienfeld | |

(Continued)

FOREIGN PATENT DOCUMENTS

JP 2037286 A 2/1990

(Continued)

OTHER PUBLICATIONS

Jewell-Larsen, et al, "Coupled-Physics Modeling of Electrostatic Fluid Accelerators for Forced Convection Cooling", American Institute of Aeronautics and Astronautics, WA, 2006, pp. 1-10.

(Continued)

*Primary Examiner* — Michail V Datskovskiy
(74) *Attorney, Agent, or Firm* — Thomas Tyson; Jeffrey L. Streets

(57) ABSTRACT

Airflow in a computer chassis may be enhanced or reduced to affect cooling of heat generating devices using an ionic air moving device. A plurality of ionic air moving devices enhance or reduce airflow through a plurality of fluidically parallel airflow zones of the computer chassis in an airflow direction established by a nonionic air moving device. Each ionic air moving device comprises an ion emitter electrode disposed a spaced distance from a collector electrode, wherein a controller independently controls an electrical potential between the emitter and collector electrodes of each ionic air moving device for affecting the rate of airflow through one or more of the plurality of airflow zones.

26 Claims, 3 Drawing Sheets

U.S. PATENT DOCUMENTS

| | | | |
|---|---|---|---|
| 7,215,552 B2 * | 5/2007 | Shipley et al. | 361/721 |
| 7,226,497 B2 | 6/2007 | Ashworth | |
| 7,269,008 B2 | 9/2007 | Mongia et al. | |
| 7,488,375 B1 * | 2/2009 | Chen | 96/25 |
| 7,532,451 B2 | 5/2009 | Krichtafovitch et al. | |
| 7,545,640 B2 | 6/2009 | Fisher et al. | |
| 7,585,352 B2 | 9/2009 | Dunn | |
| 7,661,468 B2 | 2/2010 | Schlitz | |
| 7,875,099 B2 * | 1/2011 | Abraham et al. | 95/4 |
| 2005/0047056 A1 * | 3/2005 | Huang | 361/212 |
| 2005/0200289 A1 | 9/2005 | Krichtafovitch | |
| 2005/0286224 A1 * | 12/2005 | Chao | 361/695 |
| 2006/0005946 A1 * | 1/2006 | Borgstrom et al. | 165/96 |
| 2006/0134510 A1 | 6/2006 | Cabuz | |
| 2006/0215363 A1 * | 9/2006 | Shipley et al. | 361/695 |
| 2007/0140931 A1 | 6/2007 | Huang et al. | |
| 2008/0060794 A1 | 3/2008 | Wei | |
| 2008/0302510 A1 | 12/2008 | Ouyang | |
| 2009/0168344 A1 | 7/2009 | Ploeg et al. | |
| 2009/0261268 A1 | 10/2009 | Schwiebert et al. | |
| 2010/0277844 A1 * | 11/2010 | Lueck | 361/78 |

FOREIGN PATENT DOCUMENTS

| | | |
|---|---|---|
| JP | 2287029 A | 11/1990 |
| JP | 2004129806 A * | 4/2004 |

OTHER PUBLICATIONS

Lehman, "Heat Removal of Microelectronics through Plasma Technology", Physics, University of Mary Washington, 2008 NNIN REU Research Accomplishments, pp. 56 and 57.

Jewell-Larsen, "Optimization and Miniaturization of Electrostatic Air Pumps for Thermal Management", A thesis submitted in partial fulfillment of the requirements for the degree of Master of Science in Electrical Engineering, University of Washington, Dec. 14, 2004, pp. 130.

Yang, "Corona Driven Air Propulsion for Cooling of Electronics", XIIIth International Symposium on High Voltage Engineering, Netherlands 2003, Rotterdam, pp. 1-4.

Jewell-Larsen, et al., "Electrohydrodynamic (EHD) Cooled Laptop", University of Washington Seattle, WA, 25th IEEE Semi-Therm Symposium, 2009, pp. 6 pages.

* cited by examiner

INDEPENDENTLY OPERABLE IONIC AIR MOVING DEVICES FOR ZONAL CONTROL OF AIR FLOW THROUGH A CHASSIS

BACKGROUND

1. Field of the Invention

The present invention relates to the control of airflow through a chassis for the cooling of electronic component.

2. Background of the Related Art

Computer systems include numerous components that use electrical energy and produce heat as a byproduct. Typically, these components are organized in a housing or chassis for efficient placement, storage and operation. In large computer systems, these individual chassis may be further organized into a rack-based computer system that enables many rack-mounted components to be operated in a high-density arrangement, which can produce a considerable amount of heat. However, each individual chassis may have its own unique cooling requirements that may change over time with varying workload.

Heat produced by the components within the chassis must be removed to control internal component temperatures and to maintain system reliability, performance, and longevity. In a conventional rack-based computer system, rack-mounted fans move cool air through the rack to cool the components. Standalone chassis may have their own dedicated fans. However, air moving through the chassis will tend to take the path of least resistance and it becomes necessary to consider air flow impedance between and among components and groups of components within a chassis. In order to achieve adequate airflow to each component without excessive operation of the fans, system designers will position and orient components within the chassis with due consideration to the need for adequate airflow.

A processor can produce a great deal of heat during heavy usage and is typically secured to a motherboard in direct thermal communication with large heatsink. The heatsink fins extend away from the motherboard into the path of airflow through the chassis and generally comprise a group of fins that are oriented parallel to the airflow direction. Similarly, a chassis may also support multiple memory modules that are commonly arranged together on a motherboard and oriented parallel to the airflow direction through the chassis. However, each and every processor, memory module, and other component within the chassis need adequate airflow.

In any given chassis design, the component layout and operation may be tested to assure adequate airflow to each component. Still, there is a desire to avoid excessive use of fans, since fan operation can consume significant power. It is desirable, therefore, to use airflow efficiently and effectively. This objective is complicated by the dynamic nature of workloads, and thus heat production, among the chassis components.

BRIEF SUMMARY

One embodiment of the present invention provides a system, comprising a computer chassis having an air inlet, an air outlet and containing a plurality of heat generating devices disposed in an airflow pathway between the air inlet and the air outlet, wherein one or more nonionic air moving devices causes air to flow through a plurality of fluidically parallel airflow zones of the computer chassis in an airflow direction from the air inlet to the air outlet. The system further comprises a plurality of ionic air moving devices each extending across one of the plurality of airflow zones, wherein each ionic air moving device comprises an ion emitter electrode disposed a spaced distance upstream in the airflow direction from a collector electrode, wherein the emitter electrode and the collector electrode are coupled to a power source for applying an electrical potential between the emitter electrode and the collector electrode. Still further, the system comprises a controller for independently controlling the electrical potential between the emitter and collector electrodes of each ionic air moving device for affecting the rate of airflow through one or more of the plurality of airflow zones.

Another embodiment of the invention provides a method of managing airflow through a computer chassis, comprising operating a non-ionic air moving device to cause air to flow through a plurality of fluidically parallel airflow zones of the computer chassis, and independently controlling electrical potential to a plurality of ionic air moving devices disposed in the chassis, wherein each ionic air moving device extends across an associated one of the airflow zones.

DETAILED DESCRIPTION

Figure 1:
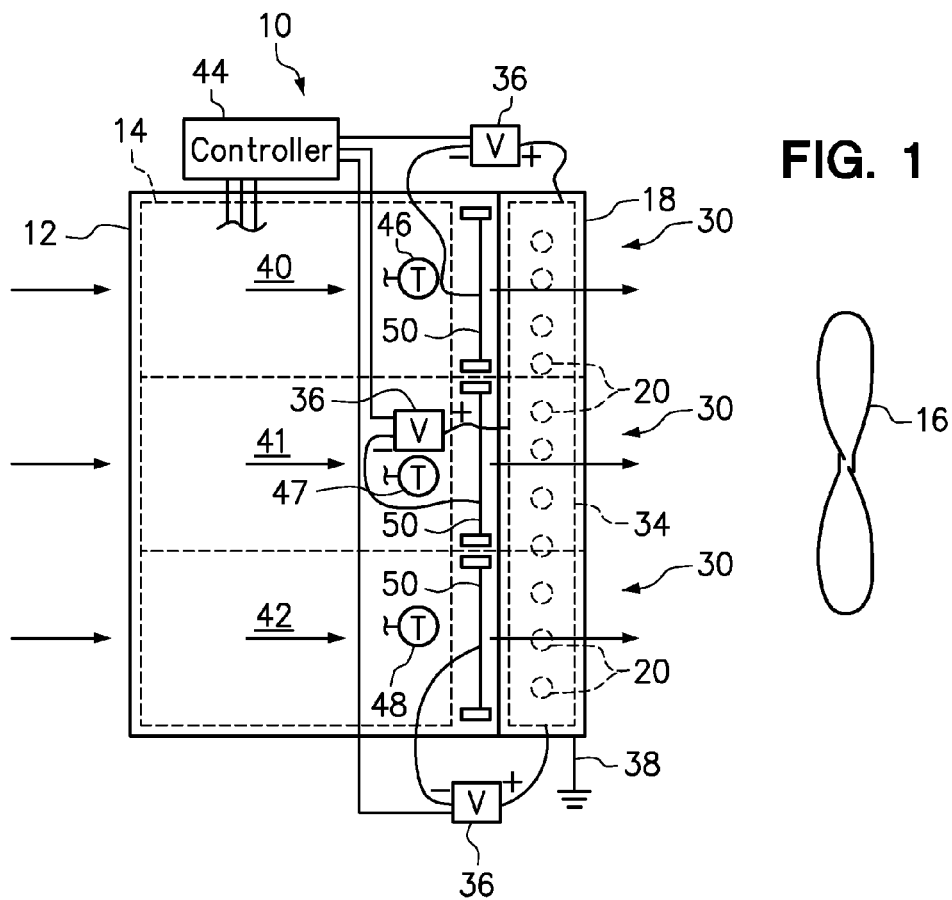
FIG. 1 is a schematic side view of an air-to-liquid heat exchanger secured to the back of a computer system rack.

One embodiment of the present invention provides a system, comprising a computer chassis having an air inlet, an air outlet and containing a plurality of heat generating devices disposed in an airflow pathway between the air inlet and the air outlet, wherein one or more nonionic air moving devices causes air to flow through a plurality of fluidically parallel airflow zones of the computer chassis in an airflow direction from the air inlet to the air outlet. The system further comprises a plurality of ionic air moving devices each extending across one of the plurality of airflow zones, wherein each ionic air moving device comprises an ion emitter electrode disposed a spaced distance upstream in the airflow direction from a collector electrode, wherein the emitter electrode and the collector electrode are coupled to a power source for applying an electrical potential between the emitter electrode and the collector electrode. Still further, the system comprises a controller for independently controlling the electrical potential between the emitter and collector electrodes of each ionic air moving device for affecting the rate of airflow through one or more of the plurality of airflow zones.

The plurality of heat generating devices may include any combination of processors, memory modules, daughter cards, power supplies, and other components that may be used in a computer system. A nonionic air moving device for moving air through the chassis may include, without limitation, a fan or blower, and may be disposed within the chassis (such as a fan module) or separate from the chassis (such as part of a computer room air conditioning (CRAC) system). The controller may be dedicated to control of the ionic air moving devices, or may be an existing controller such as a baseboard management controller (BMC) or an integrated management module (IMM). The power source for applying an electrical potential between the emitter and collector electrodes may be a dedicated power supply or the same power supply that powers the computer system within the chassis.

In one embodiment, ionic air moving device comprises an ion emitter electrode formed by an array of thin wires, and an ion collector electrode that may, for example, be formed by an air inlet panel, an air-to-liquid heat exchanger, or portions of a fan assembly. A high electric potential, such as 8000V DC or greater, is applied across the two electrodes leading to ionization of air around the wires. The ions are then attracted to the ion collector electrode and, in the process, transfer momentum to the adjacent air molecules resulting in airflow in a direction from the emitter electrode to the collector electrode. Where a nonionic air moving device has already established an airflow rate through the chassis in an airflow direction, the ionic movement of air may serve to enhance or reduce the airflow rate depending upon whether the ion emitter electrode is upstream of the collector electrode (to cause airflow enhancement or reduce airflow impedance) or downstream of the collector electrode (to cause airflow reduction or increase airflow impedance). It should be recognized that all references to upstream or downstream positions are made with reference to the airflow direction established by the nonionic air moving device.

More generally, ionic air moving devices for use in the present invention may comprise a high curvature electrode for emitting ions, such as the tip of a needle or a thin wire, and a blunt electrode for collecting ions, such as a plate or a ring. Although the electrical potential is preferably 8000V DC or greater, the power input to the ionic device may be less than 20 W with the proper optimization.

In a further embodiment, one or more of the ion emitter electrodes includes an array of wires comprising two or more independently operable circuits spanning the same airflow zone. The controller can independent apply electrical potential to any of the circuits in an array to affect the amount of air flow through the heat exchanger. For example, applying an electrical potential to a first circuit of the wires may cause a first amount of airflow, and applying an electrical potential to the first circuit and a second circuit of the wires may cause a second amount of airflow that is twice the first amount of airflow.

In yet another embodiment, the system further comprises at least one temperature sensor disposed in each airflow zone of the computer chassis, wherein the at least one temperature sensor provides a temperature signal to the controller. Accordingly, the controller of this embodiment is preferably configured to apply electrical potential to a first ionic air moving device in response to an increase in the temperature signal from the at least one temperature sensor disposed in the airflow zone associated with the first air moving device. The controller can apply electrical potential to any of the ionic air moving devices to cause increased airflow where the temperature has risen beyond a predetermined limit. The exact location of temperature measurement may vary. A few non-limiting examples include a temperature sensor built into a component such as a process, a temperature sensor in direct contact with a component, or a temperature sensor suspended in the airflow stream.

In a still further embodiment, the system further comprises an air inlet panel extending across the air inlet to the computer chassis, wherein the air inlet panel forms each of the collector electrodes. It is not necessary to electrically isolate any of the collector electrodes. In a first option, the plurality of zones is arranged laterally along a width of a motherboard within the chassis. In a second option, the plurality of heat generating devices includes one or more processors and an array of memory modules, wherein a first ionic air moving device is aligned with the one or more processors in a first airflow zone and a second ionic air moving device is aligned with the array of memory modules in a second airflow zone. In a further option, each ionic air moving device has an ion emitter electrode upstream of the air inlet panel and an ion emitter electrode downstream of the air inlet panel. Applying an electrical potential to the upstream ion emitter electrode will enhance airflow in the associated airflow zone and applying an electrical potential to the downstream ion emitter electrode will reduce airflow in the associated airflow zone.

In an additional embodiment of the invention, the system comprises an air-to-liquid heat exchanger secured to the computer chassis for cooling the airflow through the computer chassis, wherein the air-to-liquid heat exchanger forms each of the collector electrodes. Preferably, the air-to-liquid heat exchanger extends across the air inlet or the air outlet. The computer chassis may be a rack, for example where the air-to-liquid heat exchanger is a rear door heat exchanger hingedly secured to a rack. The plurality of airflow zones may be arranged vertically, such that separate ionic air moving devices may be selectively controlled as needed in that portion of the rack. It should be recognized that the air-to-liquid heat exchanger may be incorporated in various ways and locations other than the rear of a rack.

In another embodiment, the one or more nonionic air moving devices includes a plurality of fans disposed across the airflow pathway of the chassis, wherein each of the fans defines one of the airflow zones. One of the ionic air moving devices is disposed directly upstream or downstream in the airflow direction from each of the plurality of fans. Optionally, each of the ionic air moving devices includes an ion collector electrode in the form of a ring. Alternatively, each of the fans has fan blades that form the ion collector electrode. The ionic air moving device may be selectively operated along with its corresponding fan to enhance or reduce airflow through the fan, or the ionic air moving device may be operated without the corresponding fan running.

The present invention also provides a method of managing airflow through a computer chassis, comprising operating a non-ionic air moving device to cause air to flow through a plurality of fluidically parallel airflow zones of the computer chassis, and independently controlling electrical potential to a plurality of ionic air moving devices disposed in the chassis, wherein each ionic air moving device extends across an associated one of the airflow zones. Each of the plurality of ionic air moving devices may include an ion emitter electrode disposed a spaced distance from an air inlet panel forming an ion collector electrode, or an air-to-liquid heat exchanger forming an ion collector electrode.

In one embodiment of the method, the step of independently controlling electrical potential to the plurality of ionic air moving devices includes applying electrical potential to a first one of the ionic air moving devices in response to detecting a change in the configuration or workload of a heat generating component disposed within the airflow zone associated with the first ionic air moving device. The application of electrical potential to the first ionic air moving device may either enhance or reduce airflow through the associated airflow zone, depending upon the position of the ion emitter electrode relative to the ion collector electrode and the airflow direction established by the nonionic air moving device. A change in configuration may include replacement, installation or removal of a component, such as installing an additional memory module, replacing a hard disk drive, or upgrading a daughter card. Optionally, a change in configuration or workload may be detected as a change in temperature of the heat generating component, or a change in the temperature of air flowing through the airflow zone wherein the configuration or workload has changed. When the ionic air moving devices include ion emitter electrodes on both side of an ion collector electrode, the present embodiment has the ability to simultaneously enhance airflow through a first airflow zone and reduce airflow through a second airflow zone by selectively applying the electrical potential to the appropriate ion emitter electrode.

FIG. 1 is a schematic side view of a system 10 including a rack 12 supporting numerous heat-generating components of a computer system in a region 14. A nonionic air moving device (shown schematically as element 16), such as a CRAC, causes air to flow through the rack 12 in an airflow direction (see arrows) to withdraw heat from the components in the region 14. At the back of the rack 14, an air-to-liquid heat exchanger 18 is secured and operational to contact the air and draw heat into a liquid flowing through conduits 20 distributed across the back of the rack. Heatsink fins are thin plates or sheets made of a thermally and electronically conductive material, such as a metal, that typically extend parallel to the airflow direction (for example, parallel to the plane of the page as shown in FIG. 1).

To form each of the three ionic air moving devices 30, an ion emitter electrode assembly 50 is formed by an array of thin wires spaced apart, for example one inch upstream, from the fins 34 of the heat exchanger. The array of wires 32 are coupled to the negative terminal of a DC power supply 36 and the fins 34 of the heat exchanger are coupled to the positive terminal of the DC power supply 36, such that the fins 34 serve as the ion collector electrode for each of the three ionic air moving devices 30. The fins 34 are also coupled to ground 38. According to the placement of the three separate ion emitter arrays and the airflow direction, the system may be described as establishing three airflow zones 40, 41, 42. Due to the operation of the nonionic airflow device 16 already causing airflow through the rack in the airflow direction (see arrows), each ionic airflow device 30 may be selectively operated to enhance the airflow through the airflow zone in which the ionic airflow device 30 is positioned.

In one method, a controller 44 may determine that one or more of the airflow zones 40, 41, 42 of the rack 12 need additional airflow, such as by detected that the zone has become populated with heat-generating components or that the workload of the components has changed. The conditions for determining the need for additional airflow may be communicated directly from the components through network connections, or a temperature sensor 46, 47, 48 may serve as an indicator that more airflow is needed. The controller 44 may make an independent determination for each airflow zone, such that the ionic air moving device 30 associated with each of the airflow zones 40, 41, 42 can be independently engaged or disengaged. Optionally, the controller 44 may be a BMC or IMM type controller. In a separate option, the controller may reside either in the computers systems within the rack or as a stand alone unit in the rack.

Figure 2:
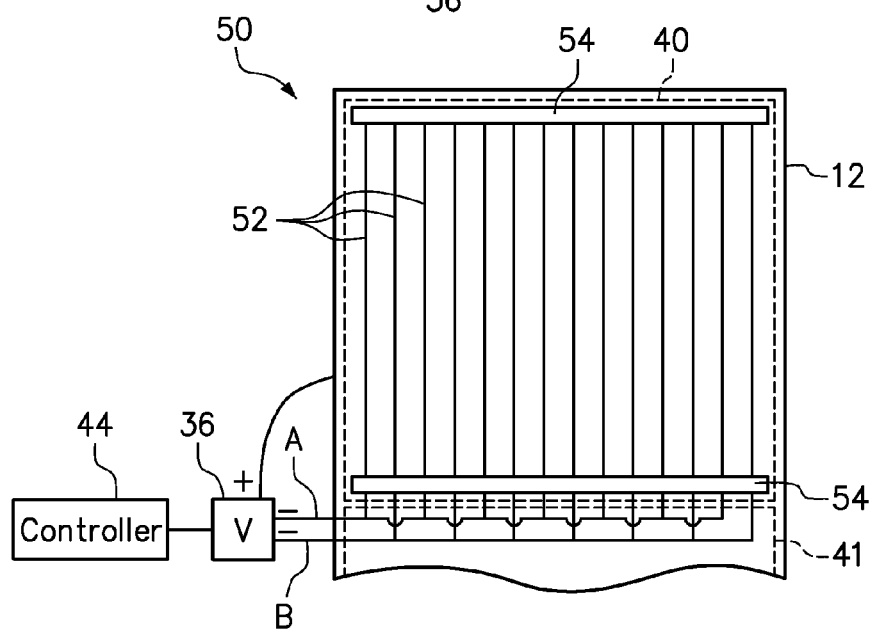
FIG. 2 is a schematic view of an ionic air moving device having two independently operable circuits extending across one airflow zone.

FIG. 2 is a schematic front view of the ion emitter electrode assembly 50 of FIG. 1 formed by an array of thin wires 52 extending across one of the airflow zones 40 in the rack 12. The electrode assembly 50 has two independently operable circuits "A" and "B" that are each coupled to the power supply 36 and can be independently energized under the control of the controller 44. As shown, circuits "A" and "B" each include seven (7) parallel wires secured between brackets 54. The wires of circuit "A" alternate with the wires of circuit "B" in a spaced apart pattern that extends across the airflow pathway of airflow zone 40. By having two independently operable circuits, one circuit can be energized to cause a first rate of airflow enhancement, both circuits can be energized to cause a second rate of airflow enhancement that is greater than the first rate, or neither circuit can be energized. This degree of control enables the controller to optimize the energy efficiency of the airflow devices.

Figure 3:
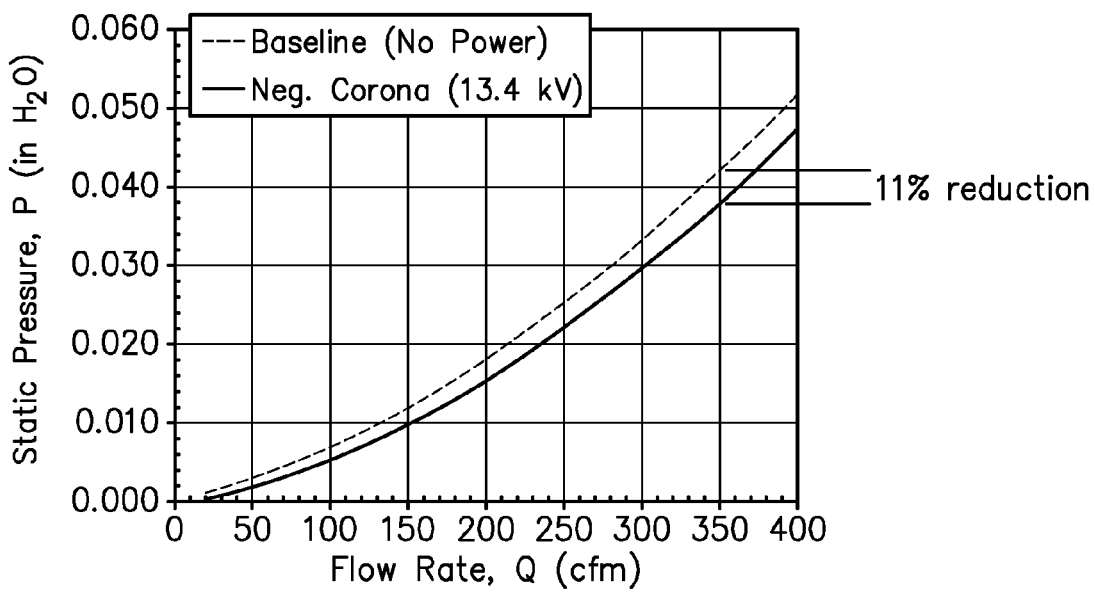
FIG. 3 is a graph of airflow impedance of the RDHx with and without use of an ionic air moving device.

FIG. 3 is a graph of airflow impedance of the read door air-to-liquid heat exchanger 18 of FIG. 1 with and without the use of an ionic air moving device 30. The dashed curve shows the airflow impedance (measured as static pressure in units of inches of water) of the heat exchanger 18 without use of the ionic air moving device 30. The solid curve shows the airflow impedance of the heat exchanger 18 with the ionic air moving device 50 energized. The data for the solid curve was collected while applying a voltage of 13.4 kV between the ion emitter electrode assembly 50 and the heat exchanger 18. The total power used by the ionic air moving device was 24 W. The two curves show that the airflow impedance through the heat exchanger is reduced by 11% at a low airflow rate of 350 cubic feet per minute (cfm) (the equivalent of about 40 cfm per U of rack space) through the airflow zone 40.

Figure 4:
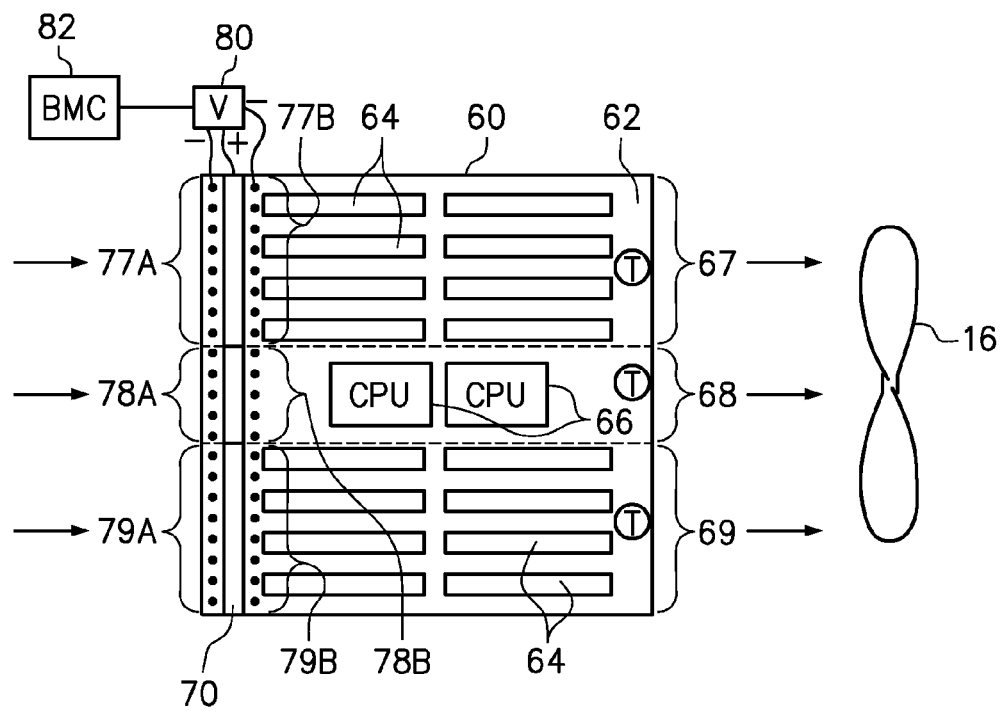
FIG. 4 is a schematic plan view of a chassis including a motherboard with a first memory module zone, a central processor zone, a second memory module zone, and an air inlet panel having three corresponding ionic air moving devices.

FIG. 4 is a schematic plan view of a chassis 60 including a motherboard 62 that secures various memory modules 64 and processors (CPUs) 66. The components on the motherboard 62 are arranged in zones, including a first memory module zone 67, a central processor zone 68, and a second memory module zone 69. A nonionic airflow device 16, such as an internal chassis fan assembly, rack fans external to the chassis or a CRAC, causes airflow through the chassis 60 (as shown by the arrows) from an air inlet panel 70, across the memory modules and processors in their respective zones 67, 68, 69, and out the back of the chassis. Accordingly, the nonionic airflow device establishes a prevailing airflow direction from front to back through the chassis 60.

The air inlet panel 70 is upstream in the airflow direction from the components in the three airflow zones 67, 68, 69. Three ion emitter electrode assemblies 77, 78, 79 are positioned a spaced distance upstream of the air inlet panel 70, which forms a common ion collector electrode. Accordingly, the configuration of the ion emitter electrode assemblies 77, 78, 79 with the collector electrode 70 establish three ionic air moving devices that are each capable of influencing the airflow through a corresponding one of the airflow zones 67, 68, 69. For example, applying an electrical potential between the ion emitter electrode assembly 77 and the collector electrode 70 will enhance the airflow through the airflow zone 67 by reducing the airflow impedance in that portion of the air inlet panel 70 aligned with the electrode assembly 77. In this embodiment, the power supply 80 may be included within the chassis 60 and a baseboard management controller (BMC) 82 on the motherboard 62 may independently control the applied voltage to each ionic air moving device. It should be recognized that the same or different power supply will be coupled to the each of the ionic air moving devices although the connections are shown only for the top ionic air moving device in FIG. 4.

In the embodiment shown in FIG. 4, the ionic air moving devices further include second ion emitter electrode assemblies 77B, 78B, 79B a spaced distance downstream of the air inlet panel 70 and generally opposing the first ion emitter electrode assemblies 77A, 78A, 79A. The BMC 82 can selectively apply an electrical potential between the second ion emitter electrode assemblies 77B, 78B, 79B and the air inlet panel 70 in order to produce an ion flow in the opposite of the airflow direction to reduce airflow in the airflow direction (see arrows) through the corresponding airflow zone. It should be recognized that the BMC 82 may independently control each ionic air moving device is one of three states: Off, On (enhancing airflow), On (reducing airflow). In either of the "On" states, the BMC may further control the amount of the electrical potential applied. In embodiments having multiple circuits (as in FIG. 2), the BMC may further control one or both circuits at any given point in time.

Optionally, the BMC 82 may monitor a temperature sensor "T" in each airflow zone in order to determine an appropriate zonal airflow. Then, the controller may operate the ionic air moving devices corresponding to one or more of the zones to achieve the desired airflow. Alternatively, the controller may monitor other parameters for use in making airflow determinations, such as temperature of individual devices (memory, CPUs, HDDs), power draw at the VR level, or power draw at the component level.

Figure 5:
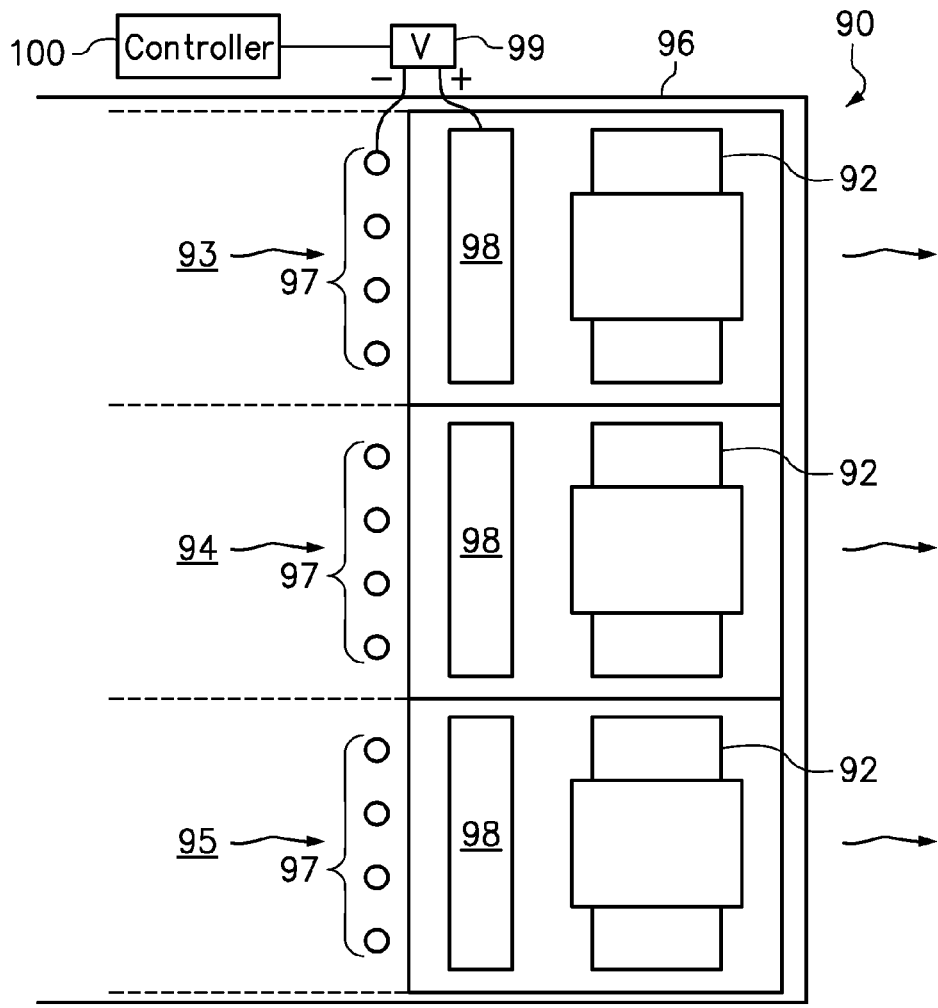
FIG. 5 is a schematic plan view of a fan assembly having three fans, and corresponding ionic air moving devices, that extend across the airflow pathway and establish three airflow zones through the chassis.

FIG. 5 is a schematic plan view of a fan assembly 90 having three fans 92, and corresponding ionic air moving devices that extend across the airflow pathway and establish three airflow zones 93, 94, 95 through a chassis 96. Each ionic air moving device includes an ion emitter electrode assembly 97 and an ion collector 98, such as a plate or ring, coupled to a power supply 99 operated by a controller 100. It should be recognized that the same or different power supply will be coupled to the each of the ionic air moving devices although the connections are shown only for the top ionic air moving device in FIG. 5.

The fan assembly 90 has multiple fans 92 to support redundancy. When one fan fails, it is not immediately removed from the system. Rather, the remaining operational fans must increase fan speeds to compensate for the lost airflow and the added impedance of the failed fan due to free wheeling of the fan blade. Optionally, the ionic air moving device corresponding to the failed fan may be energized to eliminate the added impedance of a failed system fan. The remaining running fans, therefore, do not have to increase speed as much as they otherwise would. This results in a power savings during fan failure modes. Alternatively, one or more ionic air moving device may be used along with a running fans, such that the fans will provide more airflow at that same power state and thus more CPU power can be supported. It should be recognized that the air moving devices of FIG. 5 could be positioned downstream of the fans (although they are shown upstream of the fans), and that a second ion emitter electrode assembly could be positioned opposite the collector 98 from the ion emitter electrode assembly 97 to provide directional control (as discussed in relation to FIG. 4). Furthermore, the ionic air moving devices may be separate from or integral to the fan assembly 90. Optionally, the blade or rotor of a fan 92 may be coupled to the positive terminal of the power supply 99 to form the ion collector electrode, allowing the collector 98 to be omitted.

In one embodiment, the controller 100 may sense the fan failure (perhaps detecting a reduction in fan rotations per minute (rpm)) and immediately apply an electrical potential to the ionic air moving device associated with the failing fan. When the fan has been replaced, the power will be switched back to the replacement fan.

Figure 6A:
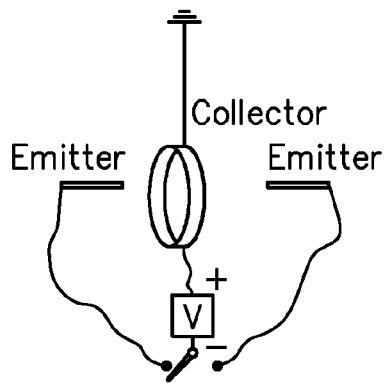
FIGS. 6A and 6B are schematic diagrams of ionic air moving devices having two ion emitter electrodes on opposing sides of an ion collector electrode to allow the direction of ionic airflow to be reversed.
Figure 6B:
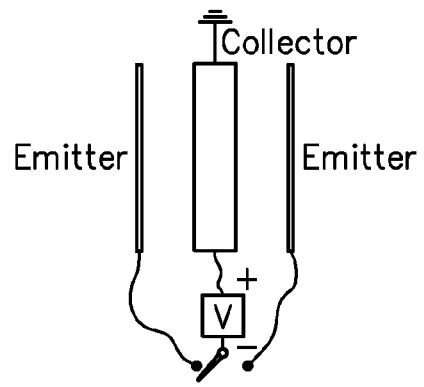

FIGS. 6A and 6B are schematic diagrams of ionic air moving devices having two ion emitter electrodes on opposing sides of an ion collector electrode to allow the direction of ionic airflow to be reversed. FIG. 6A has an ion collector in the shape of a ring and opposing ion emitter electrodes terminating in a point or pin positioned a spaced distance from the plane of the ring, but along the axial centerline of the ring. A switch (which is preferably under the control of a controller) can enable an electrical potential to be applied between a first emitter and the collector, or between a second emitter and the collector. Alternatively, the switch can be moved to a position where there is no electrical potential applied. FIG. 6B shows a similar operational relationship between two opposing ion emitter electrodes and an ion collector electrode, except that the ion collector is in the shape of a plate (possibly a perforated plate or mesh screen to allow airflow therethrough) and the opposing ion emitter electrodes are wires extending in a plane that is generally parallel to the plane of the collector.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system, comprising:
    a computer chassis having an air inlet, an air outlet and containing a plurality of heat generating devices disposed in an airflow pathway between the air inlet and the air outlet, wherein one or more nonionic air moving devices causes air to flow through a plurality of fluidically parallel airflow zones of the computer chassis in an airflow direction from the air inlet to the air outlet;
    a plurality of ionic air moving devices each extending across one of the plurality of airflow zones, wherein each ionic air moving device comprises an ion emitter electrode disposed a spaced distance upstream in the airflow direction from a collector electrode, wherein the emitter electrode and the collector electrode are coupled to a power source for applying an electrical potential between the emitter electrode and the collector electrode; and
    a controller for independently controlling the electrical potential between the emitter and collector electrodes of each ionic air moving device for affecting the rate of airflow through one or more of the plurality of airflow zones.

2. The system of claim 1, wherein each ion emitter electrode includes an array of wires.

3. The system of claim 1, wherein one or more of the ion emitter electrodes includes an array of wires comprising two or more independently operable circuits spanning the same airflow zone, and wherein the controller can independent apply electrical potential to any of the circuits in an array to affect the amount of air flow through the heat exchanger.

4. The system of claim 1, further comprising:
at least one temperature sensor disposed in each airflow zone of the computer chassis, wherein the at least one temperature sensor provides a temperature signal to the controller.

5. The system of claim 4, wherein the controller is configured to apply electrical potential to a first ionic air moving device in response to an increase in the temperature signal from the at least one temperature sensor disposed in the airflow zone associated with the first air moving device.

6. The system of claim 1, further comprising:
an air inlet panel extending across the air inlet to the computer chassis, wherein the air inlet panel forms each of the collector electrodes.

7. The system of claim 6, wherein the plurality of heat generating devices includes one or more processors and an array of memory modules, and wherein a first zone of the air inlet panel is aligned with the one or more processors and a second zone of the air inlet panel is aligned with the array of memory modules.

8. The system of claim 6, wherein the plurality of zones are arranged laterally along a width of a motherboard.

9. The system of claim 1, further comprising:
an air-to-liquid heat exchanger secured to the computer chassis for cooling the airflow through the computer chassis, wherein the air-to-liquid heat exchanger forms each of the collector electrodes.

10. The system of claim 9, wherein the air-to-liquid heat exchanger extends across the air inlet or the air outlet.

11. The system of claim 10, wherein the computer chassis is a rack.

12. The system of claim 11, wherein the plurality of zones are arranged vertically.

13. The system of claim 1, wherein the one or more non-ionic air moving devices includes a plurality of fans disposed across the airflow pathway of the chassis, wherein each of the fans defines one of the airflow zones, and wherein one of the ionic air moving devices is disposed directly upstream or downstream in the airflow direction from each of the plurality of fans.

14. The system of claim 13, wherein each of the ionic air moving devices includes an ion collector electrode in the form of a ring.

15. The system of claim 1, wherein the one or more non-ionic air moving devices includes a plurality of fans disposed across the airflow pathway of the chassis, wherein each of the fans defines one of the airflow zones, and wherein each of the fans has fan blades that form the ion collector electrode.

16. A method of managing airflow through a computer chassis, comprising:
operating a non-ionic air moving device to cause air to flow through a plurality of fluidically parallel airflow zones of the computer chassis; and
independently controlling electrical potential to a plurality of ionic air moving devices disposed in the chassis, wherein each ionic air moving device extends across an associated one of the airflow zones.

17. The method of claim 16, wherein each of the plurality of ionic air moving devices includes an emitter electrode disposed a spaced distance from an air inlet panel forming a collector electrode.

18. The method of claim 16, wherein each of the plurality of ionic air moving devices includes an emitter electrode disposed a spaced distance from an air-to-liquid heat exchanger forming a collector electrode.

19. The method of claim 16, wherein the step of independently controlling electrical potential to the plurality of ionic air moving devices includes:
applying electrical potential to a first one of the ionic air moving devices in response to detecting a change in the configuration of a heat generating component disposed within the airflow zone associated with the first ionic air moving device.

20. The method of claim 19, wherein the step of applying electrical potential to the first ionic air moving device enhances airflow through the associated airflow zone.

21. The method of claim 19, wherein the step of applying electrical potential to the first ionic air moving device reduces airflow through the associated airflow zone.

22. The method of claim 16, wherein the step of independently controlling electrical potential to the plurality of ionic air moving devices includes:
applying electrical potential to a first one of the ionic air moving devices in response to detecting a change in the workload of a heat generating component disposed within the airflow zone associated with the first ionic air moving device.

23. The method of claim 22, wherein the step of applying electrical potential to the first ionic air moving device enhances airflow through the associated airflow zone.

24. The method of claim 22, wherein the step of applying electrical potential to the first ionic air moving device reduces airflow through the associated airflow zone.

25. The method of claim 22, wherein the change in the workload is detected as a change in temperature of the heat generating component.

26. The method of claim 16, wherein the step of independently controlling electrical potential to the plurality of ionic air moving devices includes:
applying electrical potential to a first ionic air moving device to enhance airflow through a first airflow zone associated with the first ionic air moving device, and simultaneously applying electrical potential to a second ionic air moving device to reduce airflow through a second airflow zone associated with the second ionic air moving device.

* * * * *